US006272942B1

United States Patent
Ganser

(10) Patent No.: US 6,272,942 B1
(45) Date of Patent: Aug. 14, 2001

(54) WORM GEAR UNIT

(75) Inventor: Otmar Ganser, Kronberg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/320,130

(22) Filed: May 25, 1999

(30) Foreign Application Priority Data

May 30, 1998 (DE) .............................................. 198 24 382

(51) Int. Cl.[7] .............................. F16H 1/16; F16H 35/08; F16C 1/10
(52) U.S. Cl. ................................. 74/425; 74/400; 74/500
(58) Field of Search ........................... 74/400, 425, 500; 384/519, 563, 583, 585

(56) References Cited

U.S. PATENT DOCUMENTS

| 2,341,968 | * | 2/1944 | West ....................................... 74/400 |
| 2,534,536 | | 12/1950 | Staude . |
| 3,285,630 | | 11/1966 | Brundage . |
| 3,339,426 | * | 9/1967 | Borggrafe .............................. 74/425 |
| 3,848,477 | * | 11/1974 | Giandinoto et al. ................... 74/425 |
| 4,652,781 | * | 3/1987 | Andrei-Alexandru et al. ... 74/425 X |
| 5,186,068 | * | 2/1993 | Heller ..................................... 74/425 |
| 5,213,000 | * | 5/1993 | Saya et al. ............................. 74/425 |
| 5,365,801 | * | 11/1994 | Nakamura .............................. 74/425 |
| 5,777,411 | * | 7/1998 | Nakajima et al. ................. 74/425 X |
| 5,794,480 | * | 8/1998 | Schonsteiner .......................... 74/425 |
| 5,886,437 | * | 3/1999 | Bohn et al. ........................ 74/425 X |
| 6,044,723 | * | 4/2000 | Eda et al. ........................... 74/500 X |

FOREIGN PATENT DOCUMENTS

| 4137607 | 5/1992 | (DE) . |
| 19513970 | 10/1996 | (DE) . |
| 19607336 | 8/1997 | (DE) . |
| 0666210 | 8/1995 | (EP) . |
| 0731289 | 9/1996 | (EP) . |

* cited by examiner

Primary Examiner—Charles A Marmor
Assistant Examiner—Roger Pang
(74) Attorney, Agent, or Firm—Martin A. Farber

(57) ABSTRACT

A worm gear unit having at least one worm shaft displaceable in the axial direction, means with which the worm shaft can be secured once in the axial direction in order to set the play being provided according to the invention, the means being permanently secured after the play has been set.

15 Claims, 5 Drawing Sheets

WORM GEAR UNIT

FIELD AND BACKGROUND OF THE INVENTION

The invention relates to a worm gear unit having at least one worm shaft displaceable in the axial direction.

As already described in DE 198 11 977.1 (date of application: Mar. 19, 1998), worm gear units are classed as standard gear units and are used in a multiplicity of applications at the most widely varying transmission ratios. Depending on the application, worm gear units with or without self-locking may be selected.

In some applications, for example when a worm gear unit is used as a step-down gear unit in electric steering aids, it is necessary to keep the play of the worm gear unit slight in order to transmit a drive force directly and without play to the output. High-precision manufacture of the worm and the worm gear of the worm gear unit or even the use of certain tooth-flank forms could be considered as possible measures for reducing the play. However, this has the disadvantage that this is complicated and thus very cost-intensive precisely during the mass production of worm gear units, in particular for the use of electric steering aids in vehicles.

SUMMARY OF THE INVENTION

The object of the invention therefore is to provide a worm gear unit in which the play between a worm gear and a worm can be set simply and quickly, in particular within the context of mass production, in which case no great demands with regard to precise design techniques are to be imposed on the components of the gear unit.

Means which act on a worm shaft of the worm gear unit are provided by the invention, in which case this worm shaft, in order to set the play, can be secured once in the axial direction by the means (the rotation of the worm shaft still being ensured at the same time), the means being irreversibly secured after the play has been set. As a result, after assembly of the worm gear unit, which has, for example, a conventionl spur or helical tooth system, quick setting of the play is possible by the worm shaft being moved in the axial direction with such a force as to eliminate the play from the worm gear unit. After the play has been set, the means are irreversibly secured, so that, on the one hand, the means can no longer come loose during operation, in which case play would occur again. On the other hand, the irreversible securing of the means can be realized very simply from the point of view of production, so that complicated measures such as, for example, setting the play by means of a screw which is locked with a lock nut after the play has been set may be dispensed with. The measures available here for permanently securing the means are, for example, the adhesive bonding, brazing, welding or the like of the means to a corresponding mating part. In particular, such measures with which the permanent securing is effected by means of friction grip are especially advantageous, since a form grip is out of the question here on account of the setting of the play. To permanently secure the means, it is also possible for the means to be squeezed, pressed, "crushed" or the like together with a corresponding mating part, as a result of which form grip is obtained. Combinations of said possible measures are also conceivable.

In a development of the invention, the worm gear unit is arranged in a housing in a manner known per se, provision now being made according to the invention for the means to be supported on the housing (mating part). This results in a compact type of construction, in which case a receptacle for the means may already be provided during the manufacture of the housing. This also results in the advantage that, after installation of the worm gear unit in the housing, the latter can be fixed in position on a production unit, the play can be set and then the means can be permanently secured in the course of this production step, so that this also results in quick production.

In a development of the invention, the means have at least one pin, which can be permanently secured in particular to the housing after the play has been set. The use of a pin has the advantage that on the one hand, this pin may be made of a conventional bar or tube material, in which case, on the other hand, the receptacle for this at least one pin in the housing may be designed simply as a bore. Since the pin is to be permanently secured in the housing preferably by means of friction grip, it is not necessary either for any great precision-related demands to be imposed on the design of the pin and/or of the receptacle in the housing.

In a development of the invention, provision is made for the means to act directly on the worm shaft. This simple design is especially suitable if the worm shaft is not subjected to any excessively high axial forces, which would lead to wear in the abutment region between the means and the one end of the worm shaft. In addition, such a design may be used if the worm shaft has force (for example spring force) applied to it in the axial direction away from the means, so that, although certain friction would be produced in the abutment region between the one end of the worm shaft and the means, this friction would not lead to high wear.

In a development of the invention, the means act in the axial direction on at least one bearing of the worm shaft. This ensures that, compared with the direct action of the means on the worm shaft, not only is the worm shaft itself carried in a bearing, but also the play can be set via such a bearing, so that no friction can appear between the means for the permanent securing after the setting of the play and the relevant end of the worm shaft and thus wear is avoided.

In a development of the invention, the means, in particular the at least one pin, are arranged in the axial direction with the worm shaft, an axial bearing being located between one end of the worm shaft and one end of the means (the pin). In this arrangement, the worm shaft, the axial bearing and the means (pin) are arranged in alignment one behind the other in the longitudinal axis of the worm shaft, so that there is optimum action of force of the pin on the worm shaft in order to set the play, the forces for setting the play acting on the worm shaft via the axial bearing, so that wear and friction are avoided. In addition, such an arrangement, with the geometry resulting therefrom, also has the advantage that such a worm gear unit, at least in the one region of the end of the worm shaft, is of elongated and flat construction, so that this geometric design, depending on the available construction space, may be of advantage.

In a development of the invention, the means, in particular the at least one pin, are arranged in the axial direction and/or in an axis parallel to the longitudinal axis of the worm shaft, the means acting on a radial bearing of the worm shaft via a pressure ring. In such a design, the radial bearing is utilized not only for the mounting of the worm shaft but also for setting the play of the latter in the axial direction. A pressure ring is provided for the uniform distribution of force, and this pressure ring, on the one hand, can have force applied to it by the means of (the pin) and, on the other hand, acts on an outer ring of a radial bearing, designed as a ball bearing, in order to transmit the forces of the means to the worm shaft via the periphery of the radial bearing. Thus there is the advantage that the force application, which is concentrated to a certain extent, is transmitted to a force area arranged concentrically to the worm shaft and is conveyed to the worm shaft, the quick setting also being ensured on account of the use of only one pin. As an alternative, it is conceivable to use two or more pins over the outer periphery of the radial bearing, and these pins may be used to set the play. This would have the advantage that the pressure ring could be dispensed with, although the advantages of quick setting, a compact type of construction and lighter weight compared with the version having only one pin do turn out to be so optimal.

In a development of the invention, the pressure ring is designed to be plane-parallel or arched. The plane-parallel design has the advantage that manufacture is simple, the arched design additionally having the advantage that the arching may be matched to the force conditions which occur during the operation of the worm gear unit, in order thus to achieve a certain resilience, by means of which shock loads as well as material expansions or contractions on account of temperature fluctuations can be compensated for.

In a development of the invention, the pin has knurling at least in the region of the bore of the housing. Likewise, provision may be made for the housing to have a bush-like projection in the region of the bore, it being possible for this projection to be provided at the manufacturing stage of the housing.

On the one hand, this provides a guide for the insertion of the pin and, on the other hand, after the play has been set, a force is applied to the bush-like projection, this force being a concentrated force acting over the periphery of the projection or a force acting over the entire periphery of the projection, as a result of which the bush-like projection and the pin are pressed together and are thus permanently secured. In this case, the knurling of the pin has the advantage that the latter, after the pressing or the like, is securely connected to the housing.

In a further development of the invention, the pin, in the direction of the worm shaft, has a projection, in particular in the form of a point. After the insertion of the pin and after the setting of the play and the permanent securing of the pin, the projection, in particular the point, keeps its shape. The purpose of this projection, then, is that, when the components of the worm gear unit expand or contract on account of temperature fluctuations (in particular temperature increases but also temperature decreases, depending on the selection of material for the components), the projection is deformed (compressed), in particular plastically deformed, so that it is thus able to absorb the material expansions, so that the latter do not lead to damage to, or functional impairment of, the worm gear unit or the bearings. The projection may be formed in one piece with the pin, it also being conceivable, as an alternative, for the projection to be fastened to the pin. This would even have the advantage that the projection may be made of a material which keeps its shape when the forces are acting during normal operation of the worm gear unit but is deformable if forces occur as a result of temperature fluctuations.

In a development of the invention, in the same way as for the pin, provision is made for only the pressure ring (alternatively the pressure ring and the pin), in the direction of the means, in particular in the direction of the pin, to have a projection, in particular in the form of a point. The comments already made with regard to the pin also apply in this case.

An especially advantageous use of the worm gear unit is the use in an electric steering aid of a vehicle, since it is necessary in this case for the rotations produced by an actuator, in particular an electric motor, to be transmitted to steering column in a stepped-down manner and free of play in order thus to produce a steering motion of the vehicle by means of the actuator, which is activated as a function of the manipulation of a steering wheel.

In this sense, such a worm gear unit for an electric steering aid of a vehicle is also shown in the exemplary embodiment, although the worm gear unit according to the invention is not restricted to such a use, but rather a use in other fields in a more or less advantageous manner is also conceivable.

BRIEF DESCRIPTION OF THE DRAWINGS

The present invention is described below for better understanding and is explained with reference to the figures, of the drawings, of which

DETAILED DESCRIPTION OF THE
PREFERRED EMBODIMENT

Figure 1:
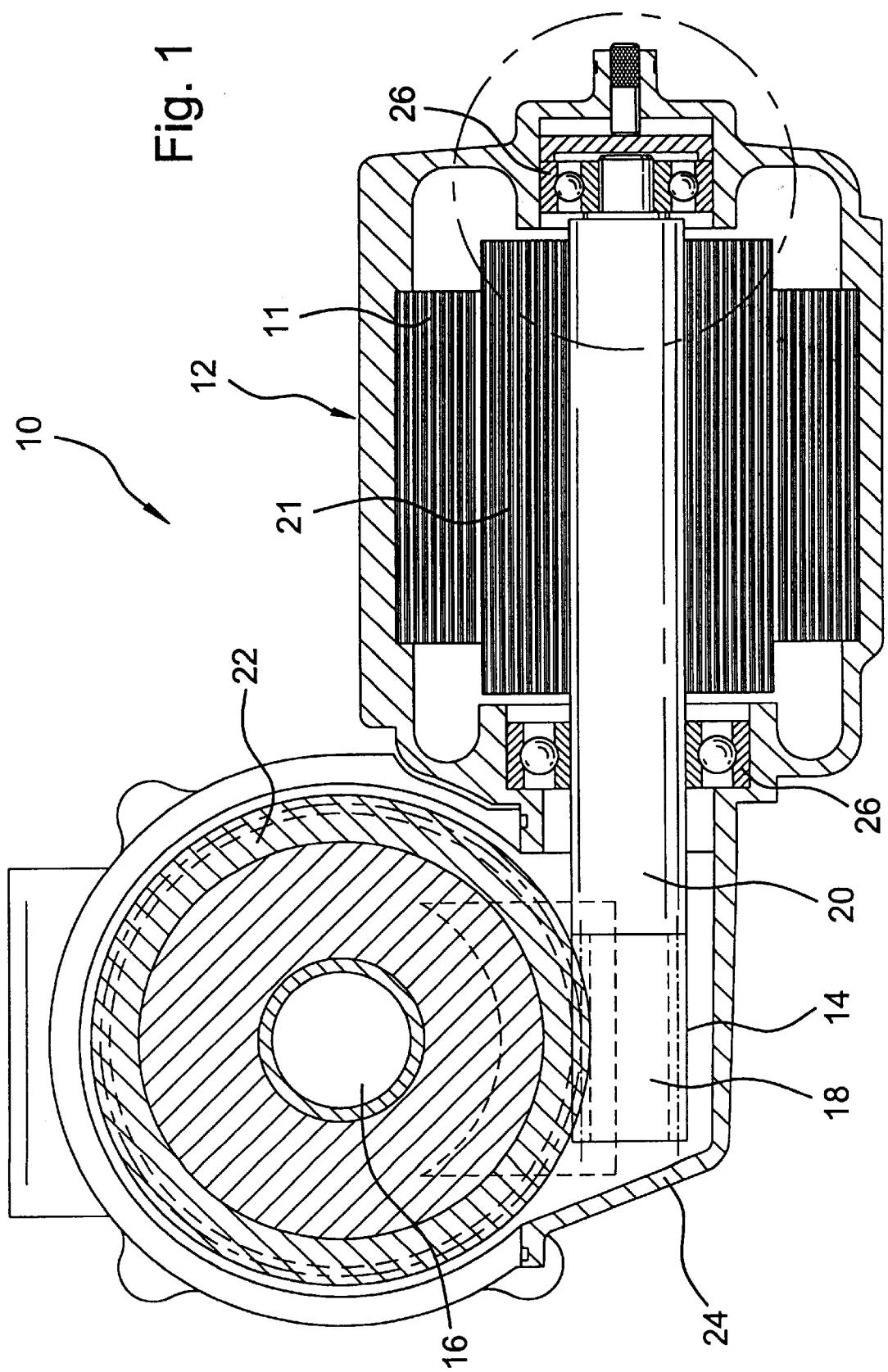
FIG. 1 shows an exemplary embodiment of an electric steering aid.

An exemplary embodiment of an electric steering aid 10 is shown in FIG. 1. The electric steering aid 10 has an electric motor 12, which has a stator 11 and assists the steering column 16 of the vehicle via a worm gear unit 14. The worm gear unit 14 consists of a worm 18, which sits in a rotationally fixed manner on a worm shaft (at the same time also the motor shaft) 20—just like a rotor 21—of the electric motor 12, and a worm gear 22, which is connected in a rotationally fixed manner to the steering column 16. The worm 18, as in the exemplary embodiment depicted, may be turned directly from the worm shaft 20; however, it is also conceivable to shrink a separate worm onto the worm shaft 20 or to connect it in a rotationally fixed manner to the worm shaft 20 in some other way. The worm gear unit 14 is not designed to be self-locking, in order not to hinder the restoring movement of the steering after curves have been negotiated; however, it may alternatively be designed to be self-locking.

The mounting of the worm shaft 20 on the housing 24 of the electric steering aid 10 is effected via ball bearings 26 (generally radial bearings), which are provided at the free end of the worm shaft 20 next to the worm 18 and between the worm 18 and the rotor 21 of the electric motor 12. The at least two bearings 26 may be arranged as shown in the figure; further arrangements are possible: namely the two bearings 26 in each case at the outermost end of the worm shaft 20 or else one bearing 26 in each case to the right and the left of the stator 11—when viewing the figure—so that the axial displaceability of the rotor 21 relative to the stator 11 is also possible as a result, in which case there is an air gap between the stator 11 and the rotor 21. In addition, in particular in the case of a very long worm shaft 20, at least a third bearing, in addition to the mounting shown in FIG. 1, may be arranged to the right of the stator 11—when viewing the figure—at the outermost end of the worm shaft 20 in order to avoid deflections.

In FIG. 1, in the region of the encircled detail (as viewed in FIG. 1 on the right-hand side), it is shown that, as already described, the right-hand end of the worm shaft 20 is mounted by means of a radial bearing, which is designed as ball bearing 26. Reference is made to the following figures for a fuller description of the encircled detail.

Figure 2:
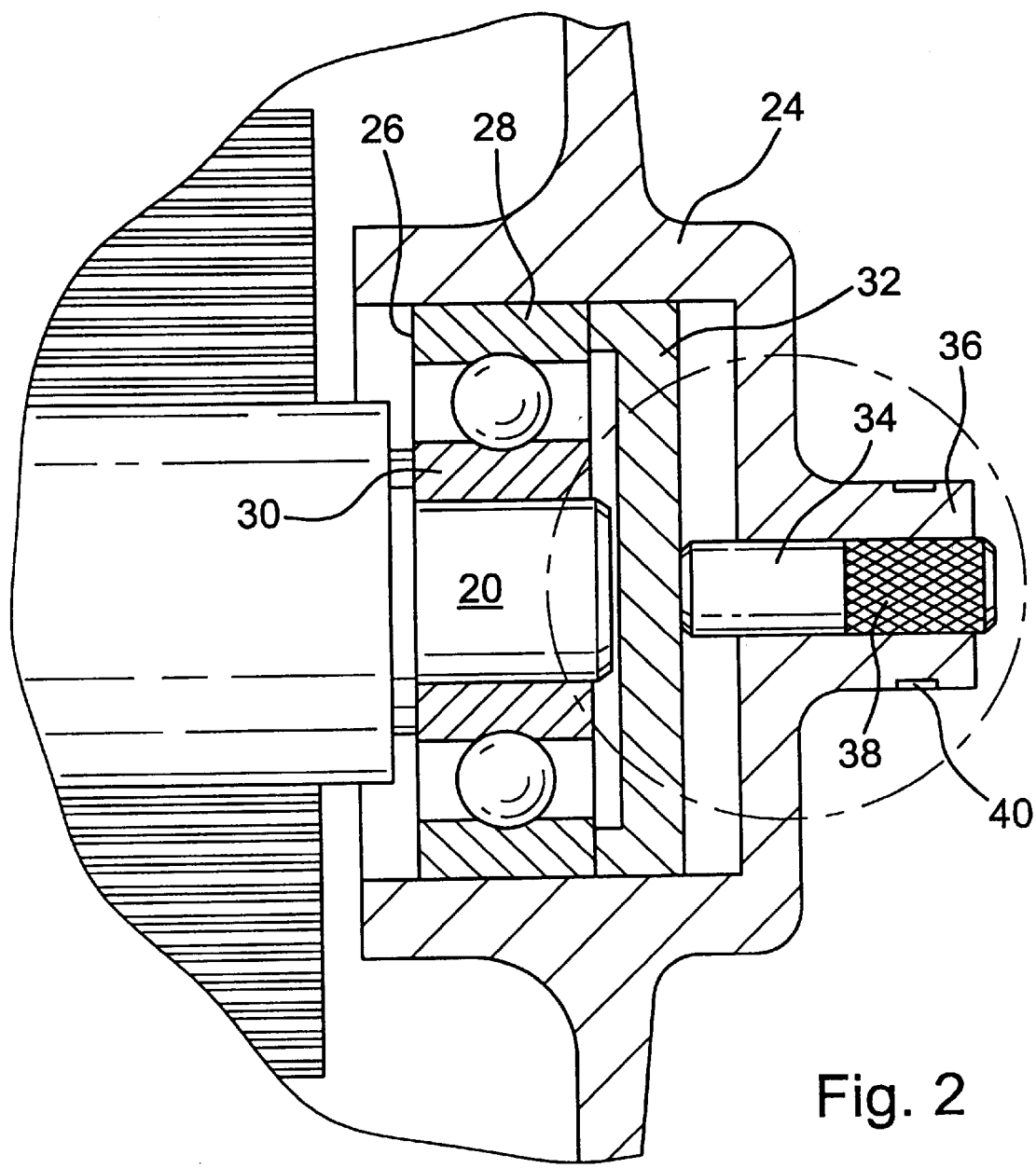
FIGS. 2 to 3 show different formations of the encircled detail according to FIG. 1.

FIG. 2 shows a first arrangement of the elements inside the encircled detail according to FIG. 1. It can be seen here that the ball bearing 26 is arranged on the end of the worm shaft 20, the ball bearing 26 having an outer ring 28 and an inner ring 30 in a manner known per se. Acting over the outer periphery of the outer ring 28 is a pressure ring 32, which has approximately the same outside diameter as the outer ring 28 of the ball bearing 26. A pin 34, which can be inserted in a bush-like projection 36 of the housing 24, acts on the outer ring 28 in order to set the axial play of the worm shaft 20. The pin 34 has knurling 38 at least in the region of the bush-like projection 36, a groove 40 which runs partly or entirely around the outer periphery of the projection 36 being provided in the region of the bush-like projection 36. The groove 40 may also be omitted, so that only the bush-like projection 36 is present.

In this case, the procedure and action are as follows: after the elements of the worm gear unit have been assembled, the pin 34 is inserted into the projection 36 (bore) and fed into this projection 36 until the pin 34 comes to bear against the pressure ring 32. After the worm shaft 20 has been inserted and rotated (which is not absolutely necessary) in such a way that the play is eliminated from the worm gear unit, the pin 34 is made to follow up with forces in the order of magnitude of manual force and then, after the play has been eliminated from the worm gear unit, irreversibly secured. This is done by a radial force acting in the direction of the pin 34 being applied to the projection 36, in particular in the region of the groove 40, so as to press the projection 36 together with the pin 34. The friction grip which now appears between the projection 36 and the pin 34 is improved by the knurling 38. Instead of a force which acts in a radially encircling manner with the groove 40, provision may also be made for this radial force to be applied only in a concentrated manner (for example at one point with appropriate abutment or at two, preferably opposite, points) in order to press the pin 34 together with the projection 36 (or in general together with the housing 24). This operation described may be automated in an extremely simple manner so that, precisely during mass production of the worm gear unit, in particular in the case of the electric steering aid, the manufacturing operation takes place quickly.

Figure 3:
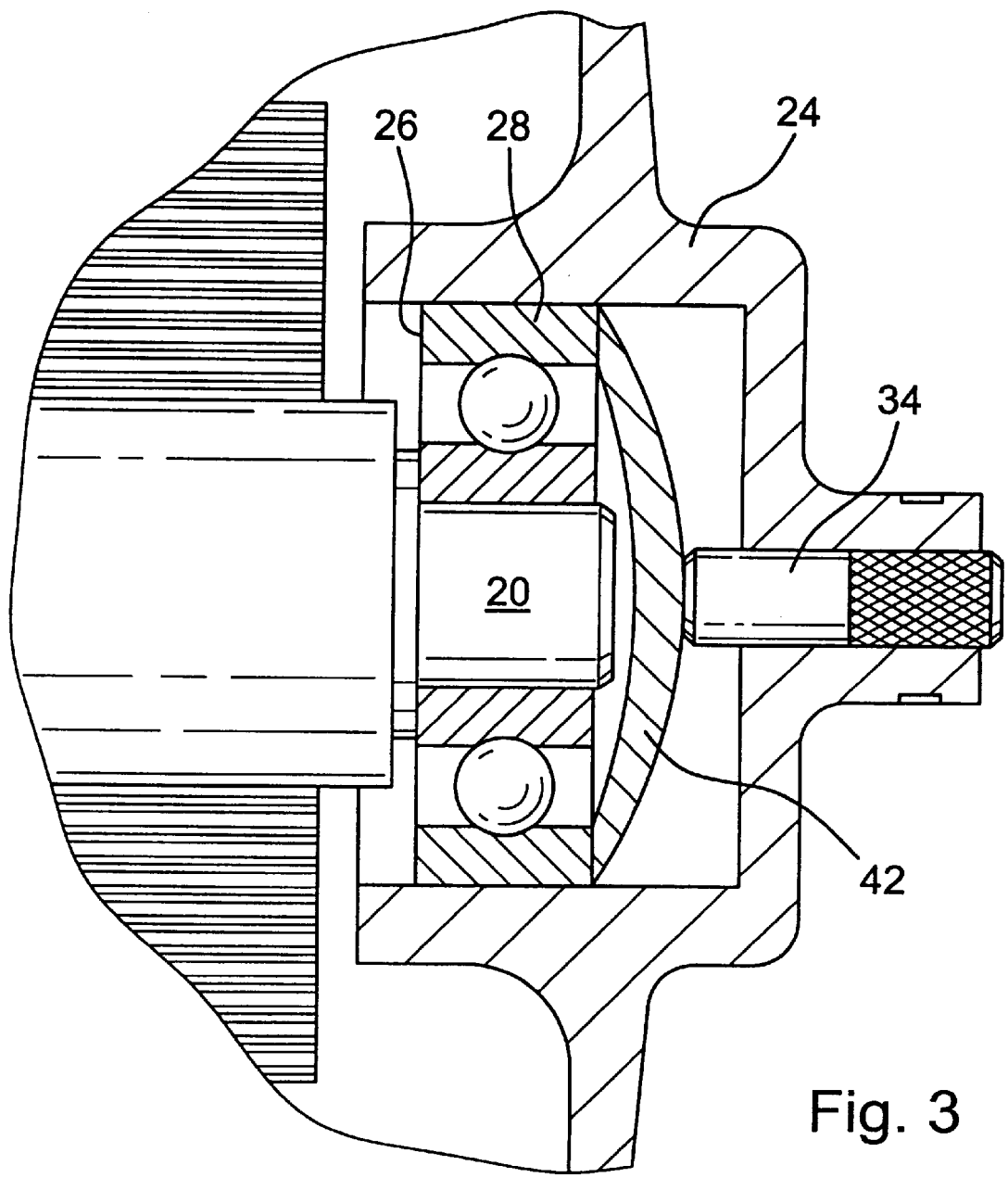

FIG. 3 shows a further arrangement of the elements of the same encircled detail according to FIG. 1, provision being made here, with the same elements as in FIG. 2, for the pressure ring 42 to be of arched form, the pressure ring 42 bearing with its peripheral end surface against the outer ring 28 of the ball bearing 26, and the pin 34 being located on that side of the pressure ring 42 which is remote therefrom. The arched form has the advantage that, in addition to the good support in the axial direction of the worm shaft 20, there is also a certain prestress and the compensation for play already described is provided.

Figure 4:
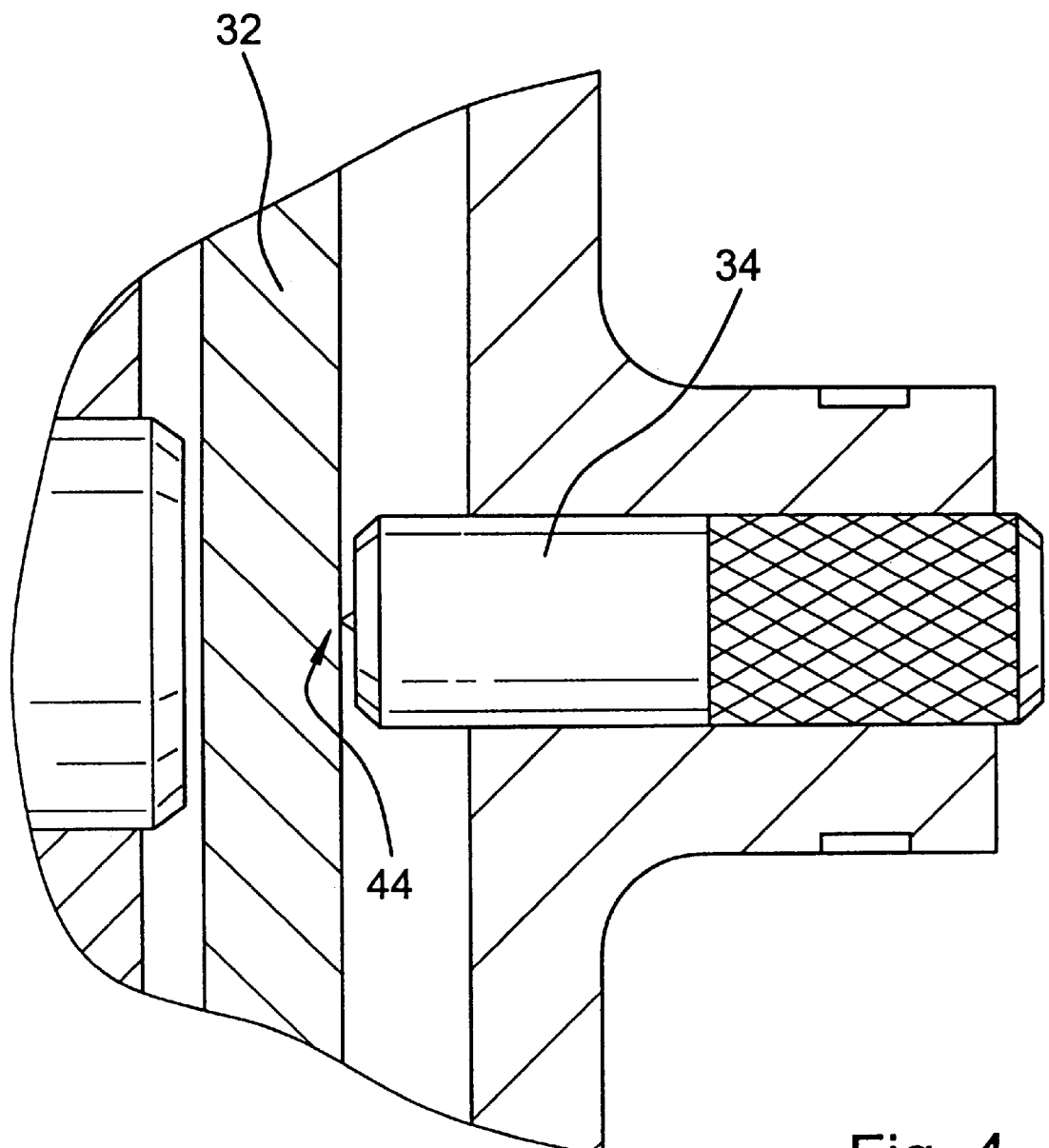
FIGS. 4–5 shows details on a pressure ring.
Figure 5:
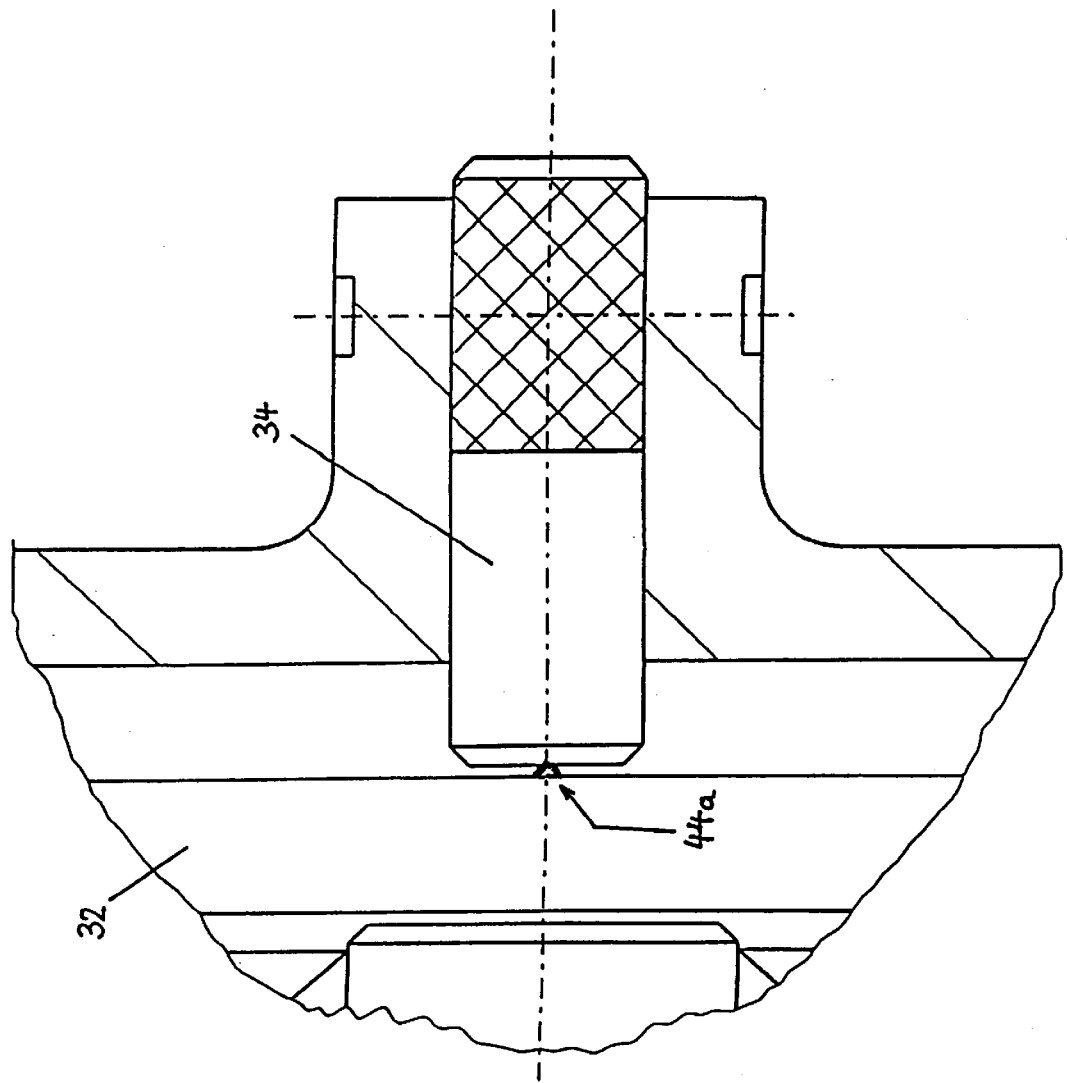

FIG. 4 shows details on the pin 34, this pin 34 having a projection in the form of a point 44. Upon insertion and when setting the compensation for play, the shape of the point 44 is retained and is deformed only when elements of the worm gear unit (in particular the worm shaft 20) expand during temperature fluctuations. Thus an allowance for play is achieved by means of the point 44, which in the event is deformable and which point 44a may also be arranged on the pressure ring 32 as shown in FIG. 5, this allowance for play acting in the case described. This projection on the pressure ring 32 or on the pin 34, as shown in FIG. 4, may of course also have another geometrical form or a combination of different forms if a plurality of projections are provided. A combination of projections on both the pressure ring 32 and the pin 34 is also conceivable. As an alternative, an insert which has the same properties as, for example, the point 44 may also be provided between the pressure ring 32 and the pin 34. Such an insert must then have such elastically deformable properties that, during normal operation of the worm gear unit, the axial forces are absorbed and do not lead to elastic deformation, whereas the elastic deformation occurs in the event of axial expansions, which without the use of the insert would lead to an impairment of the function or even to a malfunction of the worm gear unit and thus of the steering aid. It goes without saying that such a case of functional impairment or even a shutdown involves safety-related aspects which must be avoided by all possible means.

What is claimed is:

1. A worm gear unit (14) comprising at least one worm shaft (20) displaceable in the axial direction, a pin having a pointed projection directed toward the worm shaft for securing the worm shaft (20) once in the axial direction in order to set play, wherein said pin is irreversibly secured after the play has been set, and wherein the worm gear unit is arranged in a housing (24) and said pin is secured on the housing (24).

2. The worm gear unit (14) as claimed in claim 1, wherein the pin (34) is irreversibly secured to the housing (24) after the play has been set.

3. The worm gear unit (14) as claimed in claim 1, wherein said pin acts on the worm shaft (20).

4. The worm gear unit (14) as claimed in claim 1, wherein said pin acts in the axial direction on a bearing of the worm shaft (20).

5. The worm gear unit (14) as claimed in claim 4, wherein the pin (34) is arranged in the axial direction with the worm shaft (20), and said bearing is located between one end of the worm shaft (20) and one end of the pin (34).

6. The worm gear unit (14) as claimed in claim 4, wherein the pin (34), is arranged in the axial direction and/or in an axis parallel to the longitudinal axis of the worm shaft (20), the pin acting on said bearing (26) of the worm shaft (20) via a pressure ring (32).

7. The worm gear unit (14) as claimed in claim 6, wherein the pressure ring (32) is formed to be plane-parallel or arched.

8. The worm gear unit (14) as claimed in claim 1, wherein the housing (24) has a receptacle for the pin, and said receptacle comprises a bore for accommodating said pin (34).

9. A worm gear unit (14) comprising at least one worm shaft (20) displaceable in the axial direction, means for securing the worm shaft (20) once in the axial direction in order to set play, wherein said means are irreversibly secured after the play has been set, the worm gear unit is arranged in a housing (24), and said means are secured on the housing (24);

wherein the housing (24) has a receptacle for the means, said means comprises a pin, and said receptacle comprises a bore for accommodating said pin (34); and wherein said pin (34) has knurling (38) at least in the region of the bore of the housing (24).

10. A worm gear unit (14) comprising at least one worm shaft (20) displaceable in the axial direction, means for securing the worm shaft (20) once in the axial direction in order to set play, wherein said means are irreversibly secured after the play has been set, the worm gear unit is arranged in a housing (24), and said means are secured on the housing (24); and wherein the means comprise a pin (34) which, in the direction of the worm shaft (20), has at least one projection in the form of a point (44).

11. A worm gear unit (14) comprising at least one worm shaft (20) displaceable in the axial direction, at least one bearing (26) with a pressure ring (32) for positioning the worm shaft, means for securing the worm shaft (20) once in the axial direction in order to set the play, the means being irreversibly secured after the play has been set;

wherein the means act in the axial direction on said at least one bearing (26) of the worm shaft (20);

wherein the means comprises at least one pin (34) pushing against the pressure ring towards the worm shaft, and a pointed projection extending from one of the at least one pin and the ring to the other of the at least one pin and the ring, the pointed projection being arranged in the axial direction and/or in an axis parallel to the longitudinal axis of the worm shaft (20), said at least one pin acting on said at least one bearing (26) of the worm shaft (20) via said pressure ring (32); and wherein the pin pushes via the pointed projection against the pressure ring (32).

12. A worm gear unit (14) comprising at least one worm shaft (20) displaceable in the axial direction, means for securing the worm shaft (20) once in the axial direction in order to set play, wherein said means are irreversibly secured after the play has been set, the worm gear unit is arranged in a housing (24), and said means are secured on the housing (24); and wherein the means comprise a pin (34) which is inserted into a bore of the housing (24) with manual force, the play of the worm shaft (20) is set, while the pin (34) is made to follow up, and then the pin (34) is pressed together with the housing (24) by the action of force in the region of the bore.

13. The worm gear unit (14) as claimed in claim 9, wherein the worm gear unit is operative in an electric steering aid of a vehicle.

14. The worm gear unit (14) as claimed in claim 13, wherein the vehicle is a passenger motor vehicle.

15. A worm gear unit (14) comprising at least one worm shaft (20) displaceable in the axial direction, means for securing the worm shaft (20) once in the axial direction in order to set the play, the means being irreversibly secured after the play has been set;

wherein the means act in the axial direction on at least one bearing of the worm shaft (20);

wherein the means, which comprise at least one pin (34), are arranged in the axial direction and/or in an axis parallel to the longitudinal axis of the worm shaft (20), the means acting on said bearing (26) of the worm shaft (20) via a pressure ring (32); and wherein the pressure ring (32), in the direction of the means, which comprise the pin (34), has at least one projection (44a); and wherein said projection is in the form of a point.

* * * * *